US009162170B2

(12) United States Patent
Onishi et al.

(10) Patent No.: US 9,162,170 B2
(45) Date of Patent: Oct. 20, 2015

(54) SYNTHESIS REACTION SYSTEM FOR HYDROCARBON COMPOUND, AND METHOD OF REMOVING POWDERED CATALYST PARTICLES

(75) Inventors: Yasuhiro Onishi, Tokyo (JP); Yuzuru Kato, Tokyo (JP); Atsushi Murata, Tokyo (JP); Eiichi Yamada, Tokyo (JP)

(73) Assignees: JAPAN OIL, GAS AND METALS NATIONAL CORPORATION, Tokyo (JP); INPEX CORPORATION, Tokyo (JP); JX NIPPON OIL & ENERGY CORPORATION, Tokyo (JP); JAPAN PETROLEUM EXPLORATION CO., LTD., Tokyo (JP); COSMO OIL CO., LTD., Tokyo (JP); NIPPON STEEL ENGINEERING CO., LTD., Tokyo (JP)

( * ) Notice: Subject to any disclaimer, the term of this patent is extended or adjusted under 35 U.S.C. 154(b) by 889 days.

(21) Appl. No.: 12/736,108
(22) PCT Filed: Mar. 12, 2009
(86) PCT No.: PCT/JP2009/054759
§ 371 (c)(1), (2), (4) Date: Nov. 5, 2010
(87) PCT Pub. No.: WO2009/113613
PCT Pub. Date: Sep. 17, 2009

(65) Prior Publication Data
US 2011/0044859 A1    Feb. 24, 2011

(30) Foreign Application Priority Data
Mar. 14, 2008 (JP) ................................ 2008-066154

(51) Int. Cl.
*B01J 8/00* (2006.01)
*B01D 39/10* (2006.01)
*C10G 2/00* (2006.01)

(52) U.S. Cl.
CPC . *B01D 39/10* (2013.01); *B01J 8/00* (2013.01); *C10G 2/32* (2013.01); *C10G 2/342* (2013.01); *B01D 2239/0668* (2013.01); *B01J 2219/00006* (2013.01)

(58) Field of Classification Search
CPC ........... B01J 8/00; B01D 37/00; B01D 29/00; B01D 46/00
USPC .......................................................... 422/616
See application file for complete search history.

(56) References Cited

U.S. PATENT DOCUMENTS 2,780,617 A * 2/1957 Zletz ............................... 526/69
4,405,466 A   9/1983 Giannelli et al.
(Continued)

FOREIGN PATENT DOCUMENTS

EP   1 148 923   10/2003
JP   7-800        1/1995
(Continued)

OTHER PUBLICATIONS

International Search Report dated Jun. 2, 2009 issued in corresponding PCT Application No. PCT/JP2009/054759.
(Continued)

*Primary Examiner* — Walter D Griffin
*Assistant Examiner* — Huy-Tram Nguyen
(74) *Attorney, Agent, or Firm* — Kenyon and Kenyon LLP (57) ABSTRACT

A synthesis reaction system is provided with: a reactor which synthesizes a hydrocarbon compound by a chemical reaction of a synthesis gas including hydrogen and carbon monoxide as main components, and a slurry having solid catalyst particles suspended in liquid; a separator which separates the hydrocarbon compound from the slurry; and a filtering device which filters the hydrocarbon compound extracted from the separator to trap powdered catalyst particles.

11 Claims, 3 Drawing Sheets

(56) References Cited

U.S. PATENT DOCUMENTS

| | | |
|---|---|---|
| 5,599,849 A | 2/1997 | Jager et al. |
| 5,733,384 A | 3/1998 | Cao et al. |
| 5,811,469 A | 9/1998 | Leviness et al. |
| 6,114,399 A | 9/2000 | Roberts et al. |
| 6,584,782 B2 | 7/2003 | Leuenberger et al. |
| 6,792,762 B1 * | 9/2004 | Yamanaka et al. ............. 60/782 |
| 2005/0129608 A1 * | 6/2005 | Takehara et al. .......... 423/445 B |
| 2007/0014703 A1 | 1/2007 | Schweitzer et al. |
| 2007/0197667 A1 | 8/2007 | Vogel |

FOREIGN PATENT DOCUMENTS

| | | |
|---|---|---|
| JP | 10-504141 | 4/1998 |
| JP | 2007-516065 | 6/2007 |

OTHER PUBLICATIONS

Extended European Search Report dated Dec. 20, 2013 issued in corresponding EP Application No. 09720574.4.

Office Action dated Feb. 25, 2014 issued in corresponding JP Application No. 2010502869 [with English Translation].

* cited by examiner

SYNTHESIS REACTION SYSTEM FOR HYDROCARBON COMPOUND, AND METHOD OF REMOVING POWDERED CATALYST PARTICLES

TECHNICAL FIELD

The present invention relates to a synthesis reaction system for a hydrocarbon compound which synthesizes the hydrocarbon compound by introducing a synthesis gas including carbon monoxide gas and hydrogen gas as main components into a slurry having solid catalyst particles suspended in liquid hydrocarbons, and a method of removing powdered catalyst particles, which removes catalyst particles (powdered particles) included in a hydrocarbon compound in a powdered state.

This application is a national stage application of International Application No. PCT/JP2009/054759, filed Mar. 12, 2009, which claims priority to Japanese Patent Application No. 2008-66154, filed Mar. 14, 2008, the content of which is incorporated herein by reference.

BACKGROUND ART

As synthesis reaction systems which synthesize hydrocarbon compounds by a Fischer-Tropsch synthesis reaction (hereinafter referred to as "FT synthesis reaction") by using a synthesis gas mainly composed of carbon monoxide (CO) gas and hydrogen gas ($H_2$) as a raw material gas, for example, like the PATENT DOCUMENT 1, there is a bubble column type slurry bed FT reaction system which carries out the FT synthesis reaction by introducing the synthesis gas into a slurry in which solid catalyst particles are suspended in liquid hydrocarbons. Further, a hydrocarbon compound synthesized by the FT synthesis reaction is mainly utilized as a raw material for liquid fuel products such as naphtha (raw gasoline), kerosene, and gas oil.

Further, as this bubble column type slurry bed FT reaction system, for example, there is a so-called external circulation type FT reaction system including a reactor main body which accommodates a slurry, and a gas supply section which introduces synthesis gas into the bottom of the reactor main body, and an external circulation section which makes the slurry including a hydrocarbon compound synthesized within the reactor main body flow out of the reactor main body, and makes the slurry flow into the reactor main body again via a separator which separates the hydrocarbon compound from the slurry.

However, the particle diameter of the catalyst particles included in the slurry may become gradually small due to friction between catalyst particles, the friction with an inner wall of the reactor main body, or the like, and any thermal damage by the FT synthesis reaction, that is, the catalyst particles are powdered gradually. As such, since the powdered catalyst particles (hereinafter referred to as powdered particles) are apparently smaller than normal catalyst particles which are not powdered, the powdered particles may flow into next section (upgrading section) of producing liquid fuel products along with the hydrocarbon compound which are separated while not being trapped in the separator. When the powdered particles flow into the upgrading section of liquid fuel products, there is a probability that deterioration of a catalyst to be used in the step or deterioration of the liquid fuel products may be caused.

[PATENT DOCUMENT 1] Specification of US Patent Application Publication No. 2007-0014703

DISCLOSURE OF THE INVENTION

Problem that the Invention is to Solve

The present invention has been made in view of such problems, and aims at providing a method of removing powdered particles which is suitable to prevent powdered particles from flowing into an upgrading section of liquid fuel products, thereby preventing any deterioration of the liquid fuel products, in the synthesis reaction system which carries out an FT synthesis reaction.

Means for Solving the Problem

The synthesis reaction system of the present invention is provided with: a reactor which synthesizes a hydrocarbon compound by a chemical reaction of a synthesis gas including hydrogen and carbon monoxide as main components, and a slurry having solid catalyst particles suspended in liquid; a separator which separates the hydrocarbon compound from the slurry; and a filtering device which filters the hydrocarbon compound extracted from the separator to trap powdered catalyst particles.

According to the synthesis reaction system of the present invention, even if a hydrocarbon compound separated in the separator includes powdered particles, the powdered particles can be removed from the hydrocarbon compound by trapping the powdered particles in the filtering device. Therefore, it is possible to suppress mixing of the powdered particles into a hydrocarbon compound to be used in an upgrading section of liquid fuel products, and it is possible to prevent deterioration of the liquid fuel products.

Further, since a catalyst to be used in an upgrading section of liquid fuel products does not deteriorate due to the powdered particles, the cleaning of a device which produces a liquid fuel product is also easily performed, and the device can be stably and continuously operated for a long time.

Moreover, the amount of catalyst particles or powdered particles included in the hydrocarbon compound separated in the separator is influenced by the flow rate of the slurry circulating between the reactor and the separator. However, since the filtering device is not included in this circulating portion, the hydrocarbon compound can be filtered in the filtering device without being influenced by the flow rate of the slurry mentioned above.

Further, in the synthesis reaction system, a plurality of the filtering devices are provided, and the separator and each of the filtering devices are individually connected together by a supply pipeline which supplies the hydrocarbon compound to each filtering device from the separator.

In such a configuration, the hydrocarbon compound extracted from the separator can be supplied to the plurality of filtering devices separately. Therefore, even if a large amount of powdered particles are included in the hydrocarbon compound extracted from the separator, the powdered particles can be removed sufficiently.

When each branch portion of the supply pipeline is provided with a valve which opens and closes the branch portion to switch supply of the hydrocarbon compound to each filtering device, a suitable number of filtering devices can also be set according to the amount of the hydrocarbon compound extracted from the separator. That is, it is possible to adjust the number of filtering devices according to the concentration of powdered particles in the hydrocarbon compound extracted from the separator, the supply amount of a hydrocarbon compound to be supplied from the separator, or the like, and it is possible to keep the flow rate of a hydrocarbon compound passing through each filtering device constant. That is, a hydrocarbon compound can be stably filtered in each filtering device.

Moreover, when a valve is provided, it is possible to maintain the other filtering device which is not used for filtering while a hydrocarbon compound is filtered in one filtering device by opening and closing each supply pipeline by the valve so that one filtering device filters the hydrocarbon compound and simultaneously the other filtering device does not filter the hydrocarbon compound.

The hydrocarbon compound can be continuously filtered by switching opening and closing of the supply pipeline by the valve and replacing the filtering device which filters the hydrocarbon compound.

Further, the synthesis reaction system may further include a differential pressure gauge which measures the differential pressure between the upstream and downstream of the filtering device while the hydrocarbon compound has been filtered by the filtering device.

By providing the instrument which measures a differential pressure in this way, the resistance of the filtering device occurred by the flow of a hydrocarbon compound which passes through the filtering device can be measured. Since the magnitude of the resistance becomes large as the amount of powdered particles trapped in the filtering device increases, the cleaning timing of the filtering device can be determined accurately.

In addition, as mentioned above, when a plurality of filtering devices are provided, and each supply pipeline is suitably opened and closed by the valve so that the hydrocarbon compound may not be simultaneously filtered in all the filtering devices, the replacement timing of a filtering device used for filtering of the hydrocarbon compound can be determined accurately, and the hydrocarbon compound can be continuously filtered in a good state.

Further, in the synthesis reaction system, the filtering device may include a filtering vessel connected to the supply pipeline, and a filter arranged within the filtering vessel to filter the hydrocarbon compound, and a discharge pipeline which discharges the filtered hydrocarbon compound to the outside of the filtering vessel may be connected to the filter.

In this configuration, the hydrocarbon compound can be filtered as the hydrocarbon compound passing through the inside of the filter so as to go toward the discharge pipeline from the inside of the filtering vessel.

In the synthesis reaction system, powdered particles can be removed from the filter without detaching the filter from the filtering vessel by providing the cleaning device which removes the powdered particles adhered to the filter of the filtering device.

Moreover, when the cleaning device includes a cleaning fluid supply section which is connected to the discharge pipeline, and supplies a cleaning fluid to the filter via the discharge pipeline, the cleaning liquid is allowed to pass through the inside of the filter so as to go into the inside of the filtering vessel from the side of the discharge pipeline. That is, since the cleaning fluid flows in a direction opposite to a direction in which a hydrocarbon compound passes within the filter, powdered particles can be positively removed from the filter.

Further, a chemical reaction can be prevented from occurring between the hydrocarbon compound and the powdered particles by using an inert gas as the cleaning fluid.

Further, in the synthesis reaction system, preferably, the filter is a sintered metal mesh filter which has several layers of mesh sintered together, and the diameter of holes formed in the sintered metal mesh filter is a mean particle diameter or less of the powdered particles, or is set to be greater than 0 μm or equal to or less than 10 μm.

By setting the diameter of the holes in this way, the powdered particles can be positively trapped in the filter.

Further, since the sintered metal mesh filter is sintered, even if pressure applied to the filter is large when the hydrocarbon compound or cleaning liquid passes through the filter, the filter can endure the pressure sufficiently. Therefore, the same filter can be used over a prolonged period of time.

When the hole diameter of the filter is smaller than the mean particle diameter of powdered particles, powdered particles smaller than the diameter of the holes also exist, but the powdered particles can also be trapped by the filter.

That is, powdered particles whose particle diameter is greater than the hole diameter of the filter can be directly trapped in the filter, and a particle layer including the powdered particles is formed in the surface of the filter. Here, since the substantial hole diameter by the particle layer becomes sufficiently smaller than the mean particle diameter of the powdered particles, even powdered particles whose particle diameters are smaller than the hole diameter of the filter can be positively trapped in this particle layer.

The powdered catalyst particles removing method performed after extracting a hydrocarbon compound form a slurry, the hydrocarbon compound being synthesized by a chemical reaction of a synthesis gas including hydrogen and carbon monoxide as main components, and the slurry having solid catalyst particles suspended in liquid, the removing method is provided with: a filtering step of making the hydrocarbon compound pass through a filter of a filtering device in a predetermined direction to trap powdered catalyst particles, and a cleaning step of making a cleaning fluid pass through the filter in a direction opposite to the predetermined direction to remove the powdered catalyst particles from the filter.

According to the method of removing powdered particles, the filtering step is performed. Thereby, similarly to the aforementioned synthesis reaction system, it is possible to suppress mixing of the powdered particles into a hydrocarbon compound to be used in an upgrading section of liquid fuel products, and it is possible to prevent deterioration of the liquid fuel products.

Further, since the powdered particles can be positively removed from the filter by performing the cleaning step, the same filter can be repeatedly used for filtering of a hydrocarbon compound.

Further, in the method of removing powdered particles, preferably, a plurality of the filters are arranged in parallel for the hydrocarbon compound made to pass through the filter, and when the filtering step is performed in one filter, the cleaning step is simultaneously performed on the other filter, and when the filtering step is performed in the other filter, the cleaning step is simultaneously performed on one filter.

By simultaneously performing the filtering step and the cleaning step in a plurality of filters in this way, the hydrocarbon compound can be continuously filtered.

Moreover, in the method of removing powdered particles, the differential pressure between the upstream and downstream of the filtering device while the hydrocarbon compound has been filtered by the filtering device may be measured, and when a measurement result of the differential pressure becomes a predetermined threshold value or more, a step to be carried out in the filter may be switched to the cleaning step from the filtering step.

In addition, the differential pressure to be measured becomes large as the amount of powdered particles to be trapped by the filter increases. Accordingly, by carrying out the cleaning step on the filter when this differential pressure becomes a predetermined threshold value or more, the cleaning timing of the filter is determined accurately, and any deterioration of the filtering performance (efficiency) of the hydrocarbon compound in the filter can be suppressed efficiently.

Further, in the method of removing powdered particles, preferably, the threshold value is greater than 0 kPa and equal to or less than 150 kPa. That is, by stopping the filtering step by a corresponding filter when the differential pressure becomes the threshold value or more, evaporation of a hydrocarbon compound can be suppressed, and thereby the hydrocarbon compound can be prevented from loss in weight.

According to the present invention, since the powdered particles included in the hydrocarbon compound separated from the separator can be removed, it is possible to suppress mixing of the powdered particles into a hydrocarbon compound to be used in an upgrading section of liquid fuel products, and it is possible to prevent deterioration of the liquid fuel products.

DESCRIPTION OF REFERENCE NUMERALS

1: LIQUID FUEL SYNTHESIZING SYSTEM (HYDROCARBON SYNTHESIS REACTION SYSTEM)
30: BUBBLE COLUMN REACTOR
36: SEPARATOR
91: FILTERLING DEVICE
92: SUPPLY PIPELINE
93: DISCHARGE PIPELINE
95: VALVE
98: DIFFERENTIAL PRESSURE GAUGE
100: CLEANING DEVICE
911: FILTERLING CONTAINER
912: FILTER

BEST MODE FOR CARRYING OUT THE INVENTION

Hereinafter, preferred embodiments of the present invention will be described with reference to FIGS. 1 to 3.

Figure 1:
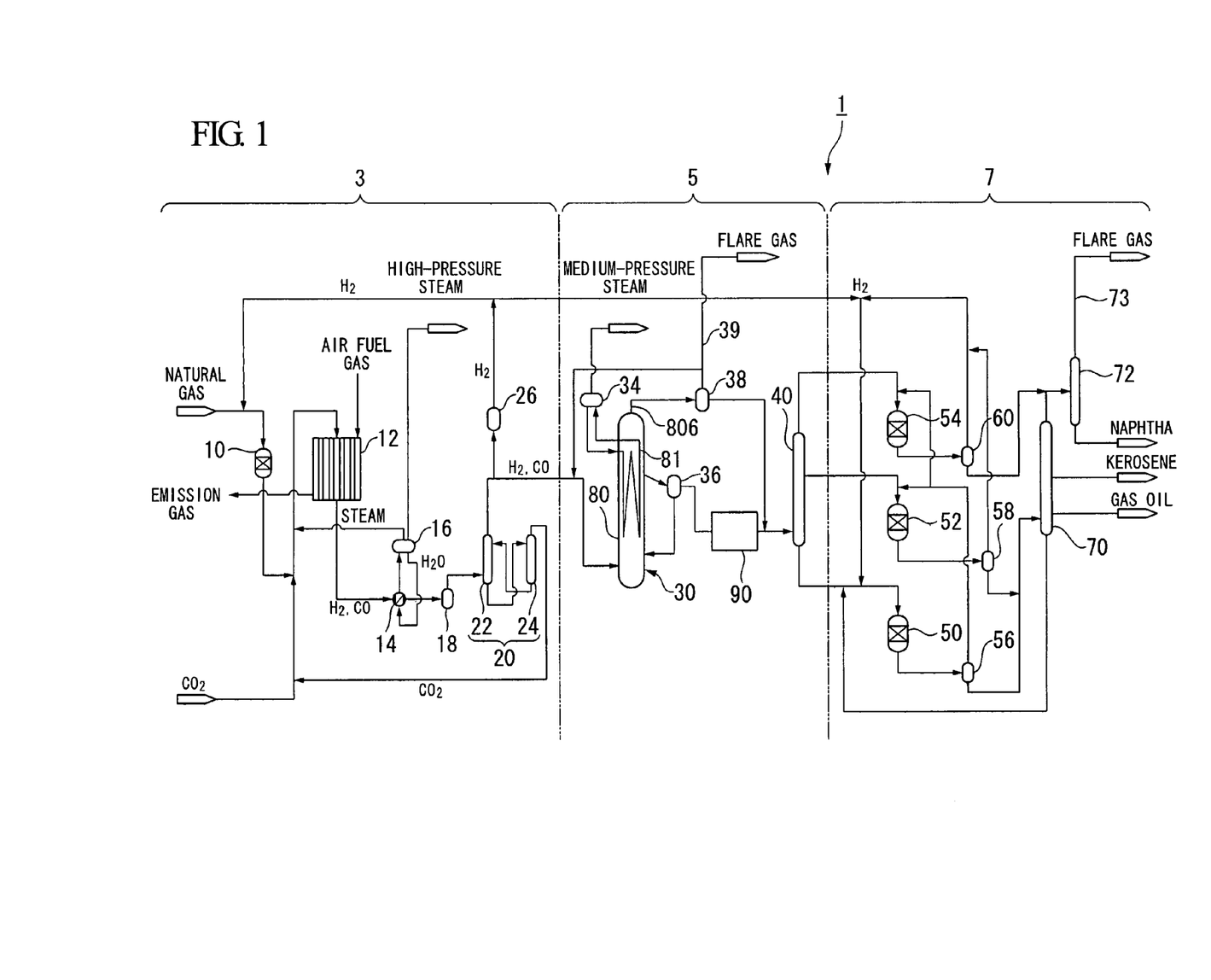
FIG. 1 is a schematic diagram showing the overall configuration of a liquid fuel synthesizing system according to an embodiment of the invention.

As shown in FIG. 1, the liquid fuel synthesizing system (hydrocarbon synthesis reaction system) 1 according to the present embodiment is a plant facility which carries out the GTL process which converts a hydrocarbon raw material, such as natural gas, into liquid fuel. This liquid fuel synthesizing system 1 includes a synthesis gas production unit 3, an FT synthesis unit 5, and an upgrading unit 7. The synthesis gas production unit 3 reforms natural gas, which is a hydrocarbon raw material, to produce synthesis gas including carbon monoxide gas and hydrogen gas. The FT synthesis unit 5 produces liquid hydrocarbons from the produced synthesis gas by the Fischer-Tropsch synthesis reaction (hereafter referred to as "FT synthesis reaction"). The upgrading unit 7 hydrogenates and hydrocracks the liquid hydrocarbons produced by the FT synthesis reaction to produce liquid fuel products (naphtha, kerosene, gas oil, wax, etc.). Hereinafter, constituent parts of each of these units will be described.

The synthesis gas production unit 3 mainly includes, for example, a desulfurizing reactor 10, a reformer 12, a waste heat boiler 14, gas-liquid separators 16 and 18, a $CO_2$ removal unit 20, and a hydrogen separating apparatus 26. The desulfurizing reactor 10 is composed of a hydrodesulfurizer, etc., and removes sulfur components from natural gas as a raw material. The reformer 12 reforms the natural gas supplied from the desulfurizing reactor 10, to produce synthesis gas including carbon monoxide gas (CO) and hydrogen gas ($H_2$) as main components. The waste heat boiler 14 recovers waste heat of the synthesis gas produced by the reformer 12, to produce high-pressure steam. The gas-liquid separator 16 separates the water heated by heat exchange with the synthesis gas in the waste heat boiler 14 into vapor (high-pressure steam) and liquid. The gas-liquid separator 18 removes condensate from the synthesis gas cooled down in the waste heat boiler 14, and supplies a gas to the $CO_2$ removal unit 20. The $CO_2$ removal unit 20 has an absorption tower 22 which removes carbon dioxide gas by using an absorbent from the synthesis gas supplied from the gas-liquid separator 18, and a regeneration tower 24 which desorbs the carbon dioxide gas and regenerates the absorbent including the carbon dioxide gas. The hydrogen separating apparatus 26 separates a portion of the hydrogen gas included in the synthesis gas, the carbon dioxide gas of which has been separated by the $CO_2$ removal unit 20. It is to be noted herein that the above $CO_2$ removal unit 20 need not to be provided depending on circumstances.

Among them, the reformer 12 reforms natural gas by using carbon dioxide and steam to produce high-temperature synthesis gas including carbon monoxide gas and hydrogen gas as main components, by a steam and carbon-dioxide-gas reforming method expressed by the following chemical reaction formulas (1) and (2). In addition, the reforming method in this reformer 12 is not limited to the example of the above steam and carbon-dioxide-gas reforming method. For example, a steam reforming method, a partial oxidation reforming method (PDX) using oxygen, an autothermal reforming method (ATR) that is a combination of the partial oxidation method and the steam reforming method, a carbon-dioxide-gas reforming method, and the like can also be utilized.

$$CH_4+H_2O \rightarrow CO+3H_2 \quad (1)$$

$$CH_4+CO_2 \rightarrow 2CO+2H_2 \quad (2)$$

Further, the hydrogen separating apparatus 26 is provided on a line branched from a main pipe which connects the $CO_2$ removal unit 20 or gas-liquid separator 18 with the bubble column reactor 30. This hydrogen separating apparatus 26 can be composed of, for example, a hydrogen PSA (Pressure Swing Adsorption) device which performs adsorption and desorption of hydrogen by using a pressure difference. This hydrogen PSA device has adsorbents (zeolitic adsorbent, activated carbon, alumina, silica gel, etc.) within a plurality of adsorption columns (not shown) which are arranged in parallel. By sequentially repeating processes including pressurizing, adsorption, desorption (pressure reduction), and purging of hydrogen in each of the adsorption columns, high-purity (for example, about 99.999%) hydrogen gas separated from the synthesis gas can be continuously supplied to various hydrogen-utilizing reaction devices (for example, the desulfurizing reactor 10, the WAX fraction hydrocracking reactor 50, the kerosene and gas oil fraction hydrotreating reactor 52, the naphtha fraction hydrotreating reactor 54, etc.) which perform predetermined reactions utilizing hydrogen.

In addition, the hydrogen gas separating method in the hydrogen separating apparatus 26 is not limited to the example of the pressure swing adsorption method as in the above hydrogen PSA device. For example, there may be a hydrogen storing alloy adsorption method, a membrane separation method, or a combination thereof.

Next, the FT synthesis unit 5 will be described. The FT synthesis unit 5 mainly includes, for example, the bubble column reactor 30, a gas-liquid separator 34, a separator 36, a gas-liquid separator 38, a first fractionator 40, and a filtering unit 90. The bubble column reactor 30, which is an example of a reactor which synthesizes synthesis gas into liquid hydrocarbons, functions as an FT synthesis reactor which converts liquid hydrocarbons from synthesis gas by the FT synthesis reaction. The bubble column reactor 30 mainly includes a reactor main body 80 and a cooling pipe 81.

The reactor main body 80 is a substantially cylindrical vessel made of metal. Slurry having solid catalyst particles suspended in liquid hydrocarbons (product of the FT synthesis reaction) is accommodated inside the reactor main body 80.

The synthesis gas including hydrogen and carbon monoxide as main components is introduced into the slurry at a lower portion of the reactor main body 80. Thus, the synthesis gas introduced into the slurry is made into bubbles, and flows through the slurry from the bottom toward the top in the vertical direction (the perpendicular direction) of the reactor main body 80. In the process, the synthesis gas is dissolved in the liquid hydrocarbons and brought into contact with the catalyst particles, whereby a synthesis reaction of the liquid hydrocarbons (FT synthesis reaction) is carried out. Specifically, as shown in the following chemical reaction formula (3), the hydrogen gas and the carbon monoxide gas follow a synthesis reaction.

$$2n\text{H}_2 + n\text{CO} \rightarrow \text{CH}_{2n} n\text{H}_2\text{O} \quad (3)$$

(where $n$ is a positive integer)

Further, the synthesis gas is made into bubbles and ascends through the reactor main body 80, and thereby an upward flow (air lift) of the slurry is generated inside the reactor main body 80. Therefore, a circulating flow of the slurry is generated inside the reactor main body 80. In addition, unreacted synthesis gas that has reached the top of the reactor main body 80 is extracted from the top of the reactor main body 80, and then is supplied to the gas-liquid separator 38.

The cooling pipe 81 is provided inside the reactor main body 80 to cool down the slurry, the temperature of which has risen due to the heat generated by the FT synthesis reaction. The cooling pipe 81 may be formed, for example, such that one pipe is bent and reciprocates a plurality of times in the vertical direction. For example, a plurality of cooling pipes having a double-pipe structure called a bayonet type may be arranged inside the reactor main body 80. That is, the shape and number of cooling pipes 81 are not limited to the above shape and number, but may be such that the cooling pipes are evenly arranged inside the reactor main body 80 and contribute to uniform cooling of the slurry.

Cooling water (for example, the temperature of which is different by about −50 to 0° C. from the interior temperature of the reactor main body 80) supplied from the gas-liquid separator 34 is caused to circulate through the cooling pipe 81. As the cooling water exchanges heat with the slurry via the wall of the cooling pipe 81 in the process during which the cooling water circulates through the cooling pipe 81, the slurry inside the reactor main body 80 is cooled down. A portion of the cooling water can be discharged to the gas-liquid separator 34 as steam, and recovered as medium-pressure steam. In addition, the medium for cooling the slurry 82 is not limited to the cooling water as described above. For example, a straight-chain and branched-chain paraffin, naphthene, olefin, low-molecular-weight silane, silyl ether, and silicone oil, etc., of $C_4$ to $C_{10}$ may be used as the medium.

The gas-liquid separator 34 separates the water circulated and heated through the cooling pipe 81 disposed in the bubble column reactor 30 into steam (medium-pressure steam) and liquid, and the liquid is supplied back to the cooling pipe 81 as cooling water. The separator 36 is connected to the upper portion and lower portion of the bubble column reactor 30, and separates the slurry, which has flowed out from the upper portion, into the liquid hydrocarbons and the slurry including a number of catalyst particles. Then, the slurry including a number of catalyst particles is returned into the bubble column reactor 30 from the lower portion of the separator 36. The gas-liquid separator 38 is connected to the unreacted gas outlet 806 of the bubble column reactor 30 to cool down unreacted synthesis gas and gaseous hydrocarbons. The first fractionator 40 distills the liquid hydrocarbons supplied via the separator 36 and the gas-liquid separator 38 from the bubble column reactor 30, and separates and refines the liquid hydrocarbons into several fractions according to boiling points.

Figure 2:
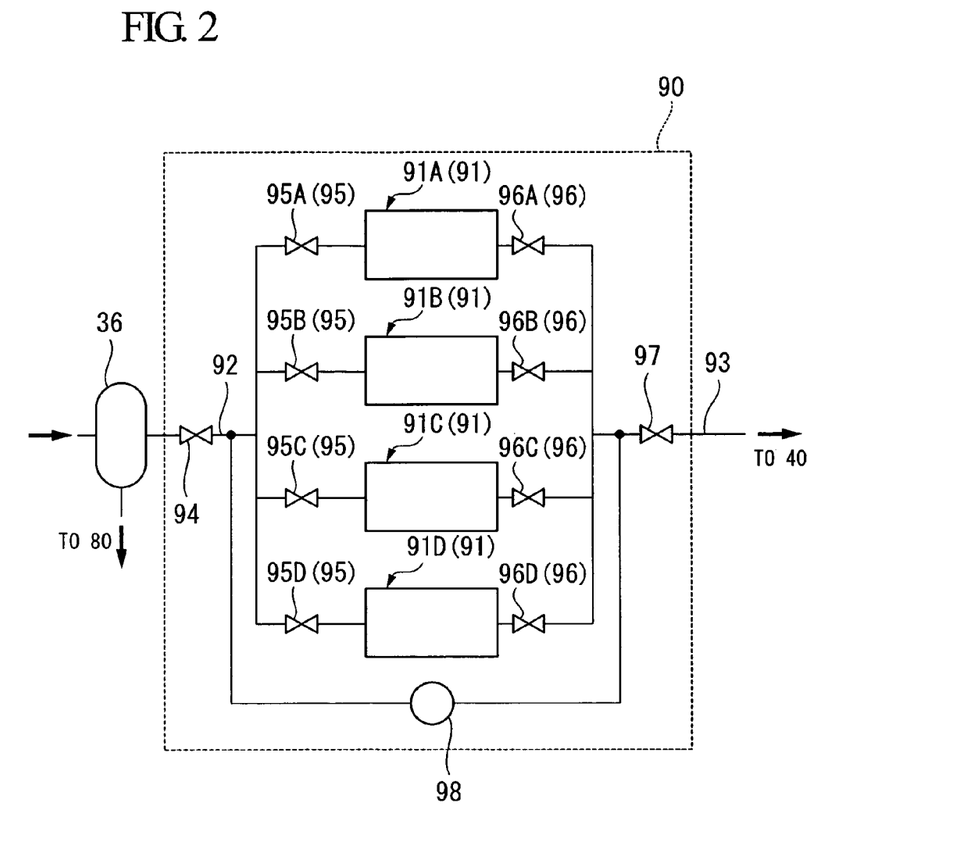
FIG. 2 is a schematic diagram showing a filtering unit which constitutes the liquid fuel synthesizing system shown in FIG. 1.

The filtering unit 90 filters the liquid hydrocarbons which have flowed out of the separator 36 and traps powdered particles included in the liquid hydrocarbons, and as shown in FIG. 2, is configured to have a plurality of filtering devices 91 (four in the illustrated example). Here, the powdered particles are particles obtained when catalyst particles are powdered by friction between the catalyst particles, friction with the inner wall of the reactor main body 80, any thermal damage caused by the FT synthesis reaction, etc.

The separator 36 and the plurality of filtering devices 91 are individually connected together by a supply pipeline 92 which comes out of the side of the separator 36 and branches on the way, and are adapted to be able to introduce the liquid hydrocarbons from the separator 36 into each filtering device 91 via this supply pipeline 92. Further, the first fractionator 40 is communicated with each of the plurality of filtering devices 91 via a discharge pipeline 93 as a collecting pipe of which a plurality of branches are respectively connected to the filtering devices 91, and are adapted to be able to transfer the liquid hydrocarbons filtered in each filtering device 91 to the first fractionator 40.

Further, a collected part of the supply pipeline 92 located on the side of the separator 36 is provided with a supply-side main valve 94 which opens and closes the collected part of the supply pipeline 92. Moreover, branches of the supply pipeline 92 located on the side of each filtering device 91 are respectively provided with valves 95 which opens and closes the branch. Further, the branches of the discharge pipeline 93 located on the side of each filtering device 91 are respectively provided with valves 96 which opens and closes the branch. Moreover, the collected part of the discharge pipeline 93 located on the side of the first fractionator 40 is provided with an outlet-side main valve 97.

The filtering unit 90 also includes a differential pressure gauge 98 which measures the differential pressure between the upstream and downstream of the filtering device 91 while the hydrocarbon compound has been filtered by the filtering device 91. Specifically, the pressure of the liquid hydrocarbons before flowing into the filtering device 91 is measured in the position before the supply pipeline 92 branches, and the pressure of the liquid hydrocarbons after being discharged from the filtering device 91 is measured in the position of the collected part of the discharge pipeline 93. In this differential pressure gauge 98, the resistance of the filtering device 91 against the flow of liquid hydrocarbons which pass through the filtering device 91 can be measured. The magnitude of the resistance becomes large as the amount of powdered particles trapped in the filtering device 91 increases.

Figure 3:
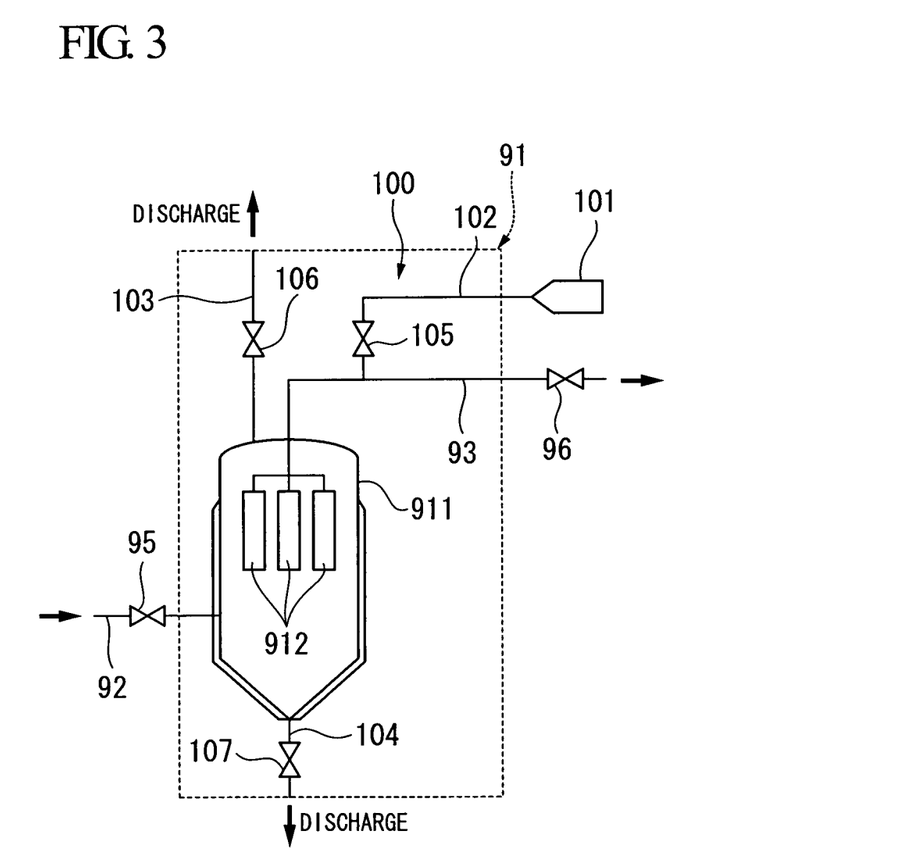
FIG. 3 is a schematic diagram showing a filtering device which constitutes the filtering unit shown in FIG. 2.

Each filtering device 91, as shown in FIG. 3 is configured to have, mainly, a filtering vessel 911 and a plurality of filters 912.

The filtering vessel 911 is configured so that it is connected to the supply pipeline 92, and can introduce the liquid hydrocarbons from the separator 36 thereinto. Each filter 912 is disposed inside the filtering vessel 911, and functions to allow the liquid hydrocarbons within the filtering vessel 911 to pass and be filtered therethrough, thereby trapping powdered particles. The discharge pipeline 93 is connected to the filter 912, and the liquid hydrocarbons filtered in the filter 912 can be directly discharged to the outside of the filtering vessel 911.

This filter 912 is constituted of, for example, a sintered metal mesh filter. The sintered metal mesh filter is obtained by overlapping a plurality of metal meshes and sintering them at high temperature in a vacuum, and can adjust the diameter of holes formed in the sintered metal mesh filter according to the size of meshes of the metal meshes and/or the number of the layer of metal mesh stacked. Here, the diameter of holes formed in the sintered metal mesh filter may be set to such a size that liquid hydrocarbons pass through the filter, but powdered particles do not pass through the filter 912, and may be changed according to the flow rate of liquid hydrocarbons introduced into the filtering device 91 or the size of powdered particles included in the liquid hydrocarbons. For example, when the size of powdered particles is small, the diameter of holes may be made smaller than the size of the powdered particles.

As for the filter 912 configured in this way, one example of results obtained by experimenting the filtering performance of the filter will be described below. In this experiment, liquid hydrocarbons including powdered particles whose concentration is 1500 wt.ppm were made to pass through the filter 912. In addition, as for the diameter of the holes of the filter 912, experiment was performed on two kinds of holes of 5 μm and 10 μm.

As a result, the concentration of powdered particles included in liquid hydrocarbons which have passed through the filter 912 was reduced to a lower limit value (4 wt.ppm) or less of measurement irrespective of the diameter of the holes. Further, it was proved that the particle diameter of powdered particles included in liquid hydrocarbons which have passed through the filter 912 is as small as unmeasurable, and is at most 8 μm or less.

Given the above results, if the concentration of powdered particles is greater than 10 wt.ppm and the particle diameter of the powdered particles is greater than 8 μm, the powdered particles can be sufficiently filtered using the filter 912 whose hole diameter is 10 μm. That is, the diameter of concrete holes formed in the filter 912 may be set to be greater than 0 μm and be equal to or less than 10 μm. In this regard, since the particle diameter of powdered particles which can pass through the filter 912 becomes small as the hole diameter of the filter 912 is made small, it is more preferable that the diameter of the holes is set to be greater than 0 μm and be smaller than or equal to 5 μm.

In addition, it is considered that the reason why the particle diameter of powdered particles included in liquid hydrocarbons which have passed through the filter 912 becomes 8 μm or less which is smaller than the above hole diameter even when the hole diameter of the filter 912 is 10 μm is because powdered particles whose particle diameter is greater than the hole diameter of the filter 912 are trapped in the surface of the filter 912. That is, when powdered particles whose particle diameter is 10 μm or more are trapped in the surface of the filter 912, a particle layer including the powdered particles is formed in the surface of the filter 912. Here, since the substantial hole diameter by the particle layer becomes sufficiently smaller than the diameter of the holes of the filter 912, even powdered particles whose particle diameter is smaller than the diameter of the holes of the filter 912 can be positively trapped in this particle layer.

When the powdered particles can be trapped in this way, the hole diameter of the filter 912 is not limited to the aforementioned numeric value range. For example, the hole diameter may be set to the mean particle diameter or less of the powdered particles. Even in this case, powdered particles included in liquid hydrocarbons introduced into the filtering device 91 are trapped in the surface of the filter 912, and thereby, a particle layer having a hole diameter sufficiently smaller than the mean particle diameter of the powdered particles is formed in the surface of the filter 912. Accordingly, even if the hole diameter of the filter 912 is set to the mean particle diameter or less of the powdered particles, the powdered particles can be trapped positively similarly to the above.

Moreover, each filtering device 91 includes a cleaning device 100 which removes powdered particles adhered to the filter 912 from the filter 912. Specifically, this cleaning device 100 is connected to the discharge pipeline 93, and is constituted of a gas supply section (cleaning fluid supply section) 101 which supplies an inert gas (cleaning fluid), such as nitrogen or argon, to the filter 912 under high pressure via the discharge pipeline 93. Thereby, when an inert gas is blown off toward the filter 912 from the gas supply section 101, the inert gas passes through the filter 912 so as to go into the filtering vessel 911 from the side of the discharge pipeline 93. That is, since the inert gas flows in a direction opposite to a direction in which a hydrocarbon compound passes within the filter 912, powdered particles can be positively removed from the filter 912. In addition, even if the inert gas is blown off into the filtering vessel 911, an unnecessary chemical reaction does not occur between the inert gas and liquid hydrocarbons or powdered particles.

Since this gas supply section 101 is connected to the discharge pipeline 93 between the filtering vessel 911 and the valve 96 of the discharge pipeline 93 via a gas supply pipeline 102, the inert gas can be supplied to the filter 912 in a state where the supply pipeline 92 and the discharge pipeline 93 are closed by the valve 95 of the supply pipeline 92 and the valve 96 of the discharge pipeline 93, that is, in a state where filtering of liquid hydrocarbons is stopped.

The inert gas which has passed through the filter 912 and has arrived at the inside of the filter can be discharged to the outside from the gas discharge pipeline 103 connected to an upper portion of the filtering vessel 911. Further, powdered particles removed from the filter 912 can be discharged to the outside via a particle discharge pipeline 104 connected to a lower end of the filtering vessel 911. In addition, since the gas supply pipeline 102, the gas discharge pipeline 103, and the particle discharge pipeline 104 are respectively provided with valves 105, 106, and 107 which open and close these pipelines, these do not obstruct filtering of liquid hydrocarbons.

Finally, the upgrading unit 7 will be described. The upgrading unit 7 includes, for example, a WAX fraction hydrocracking reactor 50, a kerosene and gas oil fraction hydrotreating reactor 52, a naphtha fraction hydrotreating reactor 54, gas-liquid separators 56, 58 and 60, a second fractionator 70, and a naphtha stabilizer 72. The WAX fraction hydrocracking reactor 50 is connected to a lower portion of the first fractionator 40. The kerosene and gas oil fraction hydrotreating reactor 52 is connected to a central portion of the first fractionator 40. The naphtha fraction hydrotreating reactor 54 is connected to an upper portion of the first fractionator 40. The gas-liquid separators 56, 58 and 60 are provided so as to correspond to the hydrogenation reactors 50, 52 and 54, respectively. The second fractionator 70 separates and refines the liquid hydrocarbons supplied from the gas-liquid separators 56 and 58 according to boiling points. The naphtha stabilizer 72 distills liquid hydrocarbons of a naphtha fraction supplied from the gas-liquid separator 60 and the second fractionator 70. Then, the naphtha stabilizer 72 discharges components lighter than butane toward flare gas, and separates and recovers components having a carbon number of five or more as a naphtha product.

Next, a process (GTL process) of synthesizing liquid fuel from natural gas by the liquid fuel synthesizing system 1 configured as above will be described.

Natural gas (whose main component is $CH_4$) as a hydrocarbon raw material is supplied to the liquid fuel synthesizing system 1 from an external natural gas supply source (not shown), such as a natural gas field or a natural gas plant. The above synthesis gas production unit 3 reforms this natural gas to produce synthesis gas (mixed gas including carbon monoxide gas and hydrogen gas as main components).

Specifically, first, the above natural gas is supplied to the desulfurizing reactor 10 along with the hydrogen gas separated by the hydrogen separating apparatus 26. The desulfurizing reactor 10 hydrogenates and desulfurizes sulfur components included in the natural gas using the hydrogen gas, with a ZnO catalyst. By desulfurizing natural gas in advance in this way, it is possible to prevent a decrease in activity of a catalyst used in the reformer 12, the bubble column reactor 30, etc. because of sulfur.

The natural gas (may also contain carbon dioxide) desulfurized in this way is supplied to the reformer 12 after the carbon dioxide ($CO_2$) gas supplied from a carbon-dioxide supply source (not shown) is mixed with the steam generated in the waste heat boiler 14. The reformer 12 reforms natural gas by using carbon dioxide and steam to produce high-temperature synthesis gas including carbon monoxide gas and hydrogen gas as main components, by the above steam and carbon-dioxide-gas reforming method. At this time, the reformer 12 is supplied with, for example, fuel gas for a burner disposed in the reformer 12 and air, and reaction heat required for the above steam and $CO_2$ reforming reaction, which is an endothermic reaction, is provided by the heat of combustion of the fuel gas in the burner and radiant heat in a furnace of the reformer 12.

The high-temperature synthesis gas (for example, 900° C., 2.0 MPaG) produced in the reformer 12 in this way is supplied to the waste heat boiler 14, and is cooled down by the heat exchange with the water which circulates through the waste heat boiler 14 (for example, 400° C.), thereby exhausting and recovering heat. At this time, the water heated by the synthesis gas in the waste heat boiler 14 is supplied to the gas-liquid separator 16. From this gas-liquid separator 16, a gas component is supplied to the reformer 12 or other external devices as high-pressure steam (for example, 3.4 to 10.0 MPaG), and water as a liquid component is returned to the waste heat boiler 14.

Meanwhile, the synthesis gas cooled down in the waste heat boiler 14 is supplied to the absorption tower 22 of the $CO_2$ removal unit 20, or the bubble column reactor 30, after condensate is separated and removed from the gas-liquid separator 18. The absorption tower 22 absorbs carbon dioxide gas included in the synthesis gas into the retained absorbent, to separate the carbon dioxide gas from the synthesis gas. The absorbent including the carbon dioxide gas within this absorption tower 22 is introduced into the regeneration tower 24, the absorbent including the carbon dioxide gas is heated and subjected to stripping treatment with, for example, steam, and the resulting desorbed carbon dioxide gas is recycled to the reformer 12 from the regeneration tower 24, and is reused for the above reforming reaction.

The synthesis gas produced in the synthesis gas production unit 3 in this way is supplied to the bubble column reactor 30 of the above FT synthesis unit 5. At this time, the composition ratio of the synthesis gas supplied to the bubble column reactor 30 is adjusted to a composition ratio (for example, $H_2$:CO=2:1 (molar ratio)) suitable for the FT synthesis reaction. In addition, the pressure of the synthesis gas supplied to the bubble column reactor 30 is raised to a pressure (for example, 3.6 MPaG) suitable for the FT synthesis reaction by a compressor (not shown) provided in a pipe which connects the $CO_2$ removal unit 20 with the bubble column reactor 30. Note that, the compressor may be removed from the pipe.

Further, a portion of the synthesis gas, the carbon dioxide gas of which has been separated by the above $CO_2$ removal unit 20, is also supplied to the hydrogen separating apparatus 26. The hydrogen separating apparatus 26 separates the hydrogen gas included in the synthesis gas, by the adsorption and desorption (hydrogen PSA) utilizing a pressure difference as described above. This separated hydrogen is continuously supplied from a gas holder (not shown), etc. via a compressor (not shown) to various hydrogen-utilizing reaction devices (for example, the desulfurizing reactor 10, the WAX fraction hydrocracking reactor 50, the kerosene and gas oil fraction hydrotreating reactor 52, the naphtha fraction hydrotreating reactor 54, etc.) which perform predetermined reactions utilizing hydrogen within the liquid fuel synthesizing system 1.

Next, the above FT synthesis unit 5 synthesizes liquid hydrocarbons by the FT synthesis reaction from the synthesis gas produced by the above synthesis gas production unit 3.

Specifically, the synthesis gas produced by the above synthesis gas production unit 3 flow's in a bottom of the reactor main body 80 constituting the bubble column reactor 30, and flows up through the slurry stored in the reactor main body 80. At this time, within the reactor main body 80, the carbon monoxide and hydrogen gas which are included in the synthesis gas react with each other by the FT synthesis reaction, thereby producing hydrocarbons. Moreover, by circulating water through the cooling pipe 81 at the time of this synthesis reaction, the heat of the FT synthesis reaction is removed, and the water heated by this heat exchange is vaporized into water vapor. As for this water vapor, the water liquefied in the gas-liquid separator 34 is returned to the cooling pipe 81 and the gas component is supplied to an external device as medium-pressure steam (for example, 1.0 to 2.5 MPaG).

The liquid hydrocarbons synthesized in the bubble column reactor 30 in this way are extracted as the slurry from the bubble column reactor 30, and are introduced into the separator 36. The separator 36 separates the extracted slurry into a solid component, such as catalyst particles, and a liquid component including liquid hydrocarbons. A portion of the separated solid component, such as the catalyst particles, is returned to the bubble column reactor 30, and a liquid component of the slurry is supplied to the first fractionator 40 via a filtering unit 90 which will be described later.

From the bubble column reactor 30, unreacted synthesis gas, and a gas component of the synthesized hydrocarbons are introduced into the gas-liquid separator 38. The gas-liquid separator 38 cools down these gases to separate some condensed liquid hydrocarbons to introduce them into the first fractionator 40. Meanwhile, as for the gas component separated in the gas-liquid separator 38, unreacted synthesis gases (CO and $H_2$) are returned to the bottom of the bubble column reactor 30, and are reused for the FT synthesis reaction. Further, the flare gas other than target products, including as a main component hydrocarbon gas having a small carbon number (equal to or less than $C_4$), is introduced into an external combustion facility (not shown), is combusted therein, and is then emitted to the atmosphere.

Then, the liquid hydrocarbons separated from the slurry in the separator 36 are introduced into the filtering unit 90 where the powdered particles included in the liquid hydrocarbons are removed. A method of removing powdered particles will now be described below.

When powdered particles are removed, the liquid hydrocarbons introduced into the filtering vessel 911 via the supply pipeline 92 in the filtering unit 90 are made to pass through the filter 912 in one direction which faces toward the discharge pipeline 93 from the inside of the filtering vessel 911, and the powdered particles included in the liquid hydrocarbons are trapped in the filter 912 (filtering step).

Further, in the filtering unit 90, powdered particles adhered to the filter 912 can be removed by closing the supply pipeline 92 and the discharge pipeline 93 located ahead of and behind the filtering device 91 by the supply main valve 94 and the discharge main valve 97 (cleaning step). Specifically, in this cleaning step, an inert gas is blown off from the gas supply section 101, and is made to pass through the filter 912 so as to go into the filtering vessel 911 from the side of the discharge pipeline 93. That is, the inert gas is made to pass through the filter 912 in a direction opposite to one direction in which liquid hydrocarbons are made to pass through the filter in the filtering step. Thereby, the powdered particles are removed from the filter 912, and descend toward the lower end of the filtering vessel 911. In addition, the powdered particles which have arrived at the lower end of the filtering vessel 911 can be discharged to the outside via the particle discharge pipeline 104 by opening the valve 107.

Then, when the filtering step is carried out in the filtering unit 90, a differential pressure between ahead of and behind the filtering device 91 is measured by the differential pressure gauge 98, and when a measurement result of this differential pressure becomes a predetermined threshold value or more, the filtering step to be carried out in the filtering unit 90 is stopped, and switching to the cleaning step is made. Since the differential pressure measured in the differential pressure gauge 98 becomes large as the amount of powdered particles trapped in the filter 912 of the filtering device 91 increases, the timing for switching to the cleaning step can be determined accurately.

It is preferable that the threshold value of the differential pressure when switching from the filtering step to the cleaning step is set to, for example, 150 kPa. This is because, if the differential pressure is set to 150 kPa or more, liquid hydrocarbons may evaporate in the discharge pipeline 93, and as a result, a raw material of liquid fuel products may lose in weight.

Further, since the filtering unit 90 is provided with the plurality of filtering devices 91, and the branch portions of the supply pipeline 92 and the discharge pipeline 93 which are individually connected to ahead of and behind each filtering device 91 are respectively provided with the valves 95 and 96 which open and close the pipelines, for example, the cleaning step can also be carried out in another set of filtering devices 91C and 91D while the filtering step is carried out in one set of filtering devices 91A and 91B.

In this case, the supply main valve 94 and the discharge main valve 97 may be opened, and simultaneously when the valves 95A, 95B, 96A, and 96B located ahead of and behind one set of filtering devices 91A and 91B are opened, the valves 95C, 95D, 96C, and 96D located ahead of and behind the other set of filtering devices 91C and 91D may be closed. Thereby, the liquid hydrocarbons from the separator 36 can be introduced into one set of filtering devices 91A and 91B where the liquid hydrocarbons are filtered, and the filtered liquid hydrocarbons can be transferred to the first fractionator 40. Further, since no liquid hydrocarbons are introduced into other set of filtering devices 91C and 91D, the powdered particles adhered to the filter 912 can be removed.

Moreover, when the filtering step is carried out by one set of filtering devices 91A and 91B, the differential pressure between ahead of and behind one set of filtering devices 91A and 91B is measured by the differential pressure gauge 98, and when the measurement result of the differential pressure becomes a predetermined threshold value or more, the valves 95A, 95B, 96A, and 96B are closed, and the cleaning step is carried out on one set of filtering devices 91A and 91B. Simultaneously with this, the valves 95C, 95D, 96C, and 96D are opened, and the filtering step is carried out by the other filtering devices 91C and 91D.

Next, the first fractionator 40 heats the liquid hydrocarbons (whose carbon numbers are various) supplied via the separator 36 and the filtering unit 90, or via the gas-liquid separator 38 from the bubble column reactor 30 as described above, to distill the liquid hydrocarbons using a difference in boiling point. Thereby, the first fractionator 40 separates and refines the liquid hydrocarbons into a naphtha fraction (whose boiling point is less than about 150° C.), a kerosene and gas oil fraction (whose boiling point is about 150 to 350° C.), and a WAX fraction (whose boiling point is greater than about 350° C.). The liquid hydrocarbons (mainly $C_{21}$ or more) as the WAX fraction extracted from the bottom of the first fractionator 40 are transferred to the WAX fraction hydrocracking reactor 50, the liquid hydrocarbons (mainly $C_{11}$ to $C_{20}$) as the kerosene and gas oil fraction extracted from the central portion of the first fractionator 40 are transferred to the kerosene and gas oil fraction hydrotreating reactor 52, and the liquid hydrocarbons (mainly $C_5$ to $C_{10}$) as the naphtha fraction extracted from the upper portion of the first fractionator 40 are transferred to the naphtha fraction hydrotreating reactor 54.

The WAX fraction hydrocracking reactor 50 hydrocracks the liquid hydrocarbons as the WAX fraction with a large carbon number (approximately $C_{21}$ or more), which have been supplied from the lower portion of the first fractionator 40, by using the hydrogen gas supplied from the above hydrogen separating apparatus 26, to reduce the carbon number to $C_{20}$ or less. In this hydrocracking reaction, hydrocarbons with a small carbon number and with low molecular weight are produced by cleaving C—C bonds of hydrocarbons with a large carbon number, using a catalyst and heat. A product including the liquid hydrocarbons hydrocracked by this WAX fraction hydrocracking reactor 50 is separated into gas and liquid in the gas-liquid separator 56, the liquid hydrocarbons of which are transferred to the second fractionator 70, and the gas component (including hydrogen gas) of which is transferred to the kerosene and gas oil fraction hydrotreating reactor 52 and the naphtha fraction hydrotreating reactor 54.

The kerosene and gas oil fraction hydrotreating reactor 52 hydrotreats liquid hydrocarbons (approximately $C_{11}$ to $C_{20}$)

as the kerosene and gas oil fractions having an approximately middle carbon number, which have been supplied from the central portion of the first fractionator 40, by using the hydrogen gas supplied via the WAX fraction hydrocracking reactor 50 from the hydrogen separating apparatus 26. In this hydrotreating reaction, the liquid hydrocarbons are isomerized and unsaturated bonds of the above liquid hydrocarbons are added hydrogen to saturated the liquid hydrocarbons, and thereby side-chain saturated hydrocarbons are mainly obtained. As a result, a product including the hydrotreated liquid hydrocarbons is separated into gas and liquid in the gas-liquid separator 58, the liquid hydrocarbons of which are transferred to the second fractionator 70, and the gas component (including hydrogen gas) of which is reused for the above hydrogenation reaction.

The naphtha fraction hydrotreating reactor 54 hydrotreats liquid hydrocarbons (approximately $C_{10}$ or less) as the naphtha fraction with a low carbon number, which have been supplied from the upper portion of the first fractionator 40, by using the hydrogen gas supplied via the WAX fraction hydrocracking reactor 50 from the hydrogen separating apparatus 26. As a result, a product including the hydrotreated liquid hydrocarbons is separated into gas and liquid in the gas-liquid separator 60, the liquid hydrocarbons of which are transferred to the naphtha stabilizer 72, and the gas component (including hydrogen gas) of which is reused for the above hydrogenation reaction.

Next, the second fractionator 70 distills the liquid hydrocarbons supplied from the WAX fraction hydrocracking reactor 50 and the kerosene and gas oil fraction hydrotreating reactor 52 as described above. Thereby, the second fractionator 70 separates and refines the liquid hydrocarbons into a hydrocarbon fraction (whose boiling point is less than about 150° C.) with a carbon number of $C_{10}$ or less, kerosene (whose boiling point is about 150 to 250° C.), gas oil (whose boiling point is about 250 to 350° C.), and undegraded WAX fraction (whose boiling point is higher than substantially 350° C.) from the WAX fraction hydrocracking reactor 50. The gas oil is extracted from a lower portion of the second fractionator 70, and the kerosene is extracted from a central portion thereof. Meanwhile, a hydrocarbon gas with a carbon number of $C_{10}$ or less is extracted from the top of the second fractionator 70, and is supplied to the naphtha stabilizer 72.

Moreover, the naphtha stabilizer 72 distills the hydrocarbons with a carbon number of $C_{10}$ or less, which have been supplied from the above naphtha fraction hydrotreating reactor 54 and second fractionator 70. Thereby, the naphtha stabilizer 72 separates and refines naphtha ($C_5$ to $C_{10}$) as a product. Accordingly, high-purity naphtha is extracted from a lower portion of the naphtha stabilizer 72. Meanwhile, the flare gas other than target products, which contains as a main component hydrocarbons with a carbon number lower than or equal to a predetermined number (lower than or equal to $C_4$), is discharged from the top of the naphtha stabilizer 72. Further, the flare gas is introduced into an external combustion facility (not shown), is combusted therein, and is then discharged to the atmosphere.

According to the liquid fuel synthesizing system 1 and the method of removing powdered particles related to the present embodiment, even if liquid hydrocarbons separated in the separator 36 include powdered particles, the powdered particles can be removed from the liquid hydrocarbons by trapping the powdered particles in the filtering device 91. Therefore, it is possible to suppress mixing of the powdered particles into liquid hydrocarbons to be used in an upgrading section of liquid fuel products as a raw material of the liquid fuel products, and it is possible to prevent deactivation of the liquid fuel products.

Further, since a catalyst to be used when a liquid fuel product is produced as in the WAX fraction hydrocracking reactor 50 or the like does not deteriorate due to the powdered particles, the cleaning of the upgrading unit 7 (device) which produces a liquid fuel product by using liquid hydrocarbons is also easy, and continuous operation can be stably performed for a long time.

Moreover, the amount of catalyst particles or powdered particles included in the liquid hydrocarbons separated in the separator 36 is influenced by the flow rate of slurry circulating between the reactor 30 and the separator 36. However, since the filtering device 91 is not included in this circulating portion, the liquid hydrocarbons can be filtered in the filtering device 91 without being influenced by the flow rate of the slurry mentioned above.

Further, by arranging a plurality of filtering devices 91 in parallel in the separator 36 and the first fractionator 40, the liquid hydrocarbons extracted from the separator 36 can be separated and supplied to the plurality of filtering devices 91. Therefore, even if a large amount of powdered particles are included in the liquid hydrocarbons extracted from the separator 36, these powdered particles can be removed sufficiently.

Moreover, by switching the opening and closing of the branch portions of the supply pipeline 92 and the discharge pipeline 93 by the valves 95A to 95D and 96A to 96D to replace the filtering device 91 which filters liquid hydrocarbons, and simultaneously carrying out the filtering step and the cleaning step, the liquid hydrocarbons can be filtered continuously. In particular, since switching timing can be accurately determined by measuring the differential pressure of liquid hydrocarbons between ahead of and behind the filtering unit 90 by a differential pressure gauge, the liquid hydrocarbons can be continuously filtered in a good state.

Further, by providing the cleaning device 100 in the filtering device 91 and thereby performing the cleaning step, powdered particles can be removed positively from the filter 912 without detaching the filter 912 from the filtering vessel 911, and the same filter 912 can be repeatedly used for filtering of liquid hydrocarbons. Moreover, since the filter 912 is sintered, even if high pressure is applied to the filter 912 by liquid hydrocarbons or an inert gas in the filtering step or cleaning step, the filter can endure the high pressure sufficiently. Therefore, the same filter 912 can be used over a prolonged period of time.

In addition, in the above embodiment, switching to the filtering step and the cleaning step is made with half of a plurality of filters 91 as one set. However, the invention is not limited thereto, and switching to the filtering step and the cleaning step may be made with a plurality of filters 91 separated into arbitrary sets.

For example, simultaneously when the filtering step is performed with only one filtering device 91 (one filtering device), the cleaning step may be carried out on a plurality of remaining filtering devices 91 (other filtering devices), and when one filtering device 91 is switched from the filtering step to the cleaning step, one of the plurality of filtering devices 91 which carry out the cleaning step may be switched to the filtering step. Further, for example, simultaneously when the cleaning step is performed on only one filtering device 91 (other filtering device), the filtering step may be carried out by a plurality of remaining filtering devices 91 (one filtering device), and when one filtering device 91 is switched from the filtering step to the cleaning step, one filtering device 91 which has carried out the cleaning step may be switched to the filtering step.

Further, even when it is not considered that the cleaning step and the filtering step are performed simultaneously, the number of suitable filtering devices 91 which carry out the filtering step can be set according to the amount of the liquid hydrocarbons extracted from a separator 36 by suitably opening and closing the branch portions of the supply pipeline 92 and the discharge pipeline 93 by the valves 95A to 95D and 96A to 96D. That is, it is possible to adjust the number of filtering devices 91 according to changes in the concentration of powdered particles in the liquid hydrocarbons introduced from the separator 36, the supply flow rate of the liquid hydrocarbons, or the like, and it is possible to keep the flow rate of liquid hydrocarbons passing through each filtering device 91 constant. That is, liquid hydrocarbons can be stably filtered in each filtering device 91.

Moreover, although the cleaning device 100 is provided in each filtering device 91, for example, one cleaning device may be provided in a plurality of filtering devices 91. In this case, the gas supply pipeline 102 may be branched so as to be connected to each branch portion of the discharge pipeline 93. Further, the filtering device 91 which supplies an inert gas can be selected by providing the valve 105 in each branch portion of the gas supply pipeline 102 and by selectively opening and closing the branch portions of the gas supply pipeline 102 by these valves 105.

Further, the cleaning fluid which removes powdered particles from the filter 912 is not limited to the inert gas, such as nitrogen or argon. For example, the cleaning liquid may be liquids which do not chemically react with liquid hydrocarbons or (catalyst particles) powdered particles. This liquid may be, for example, several fractions of liquid hydrocarbons which are separated and refined in the first fractionator 40, products including liquid hydrocarbons which are hydrocracked and hydrotreated in the hydrogenation reactors 50, 52, and 54, liquid hydrocarbons which are separated in the gas-liquid separators 56, 58, and 60, and liquid fuel products, such as kerosene and gas oil, which are separated and refined in the second fractionator 70.

Moreover, although the gas supply section 101 is mentioned as the cleaning device 100 which removes the powdered particles adhered to the filter 912, for example, the cleaning device may be a vibrating device which vibrates the filter 912 and shakes off the powdered particles from the filter 912. Even in this case, similarly to the above embodiment, the powdered particles can be removed from the filter 912 without detaching the filter 912 from the filtering vessel 911.

Further, although each filtering device 91 is provided with a plurality of filters 912, the number of filters may be increased and decreased according to required filtering performance, that is, only one filter 912 may be provided.

Moreover, the plurality of filtering devices 91 are not limited to be arranged in parallel to the separator 36 and the first fractionator 40 but, for example, may be arranged in series between the separator 36 and the first fractionator 40. In this case, for example, the hole diameter of the filter 912 in the filtering device 91 on the side of the separator 36 is enlarged, or the hole diameter may be made small in the filtering device 91 on the side of the first fractionator 40. In this configuration, powdered particles are removed in a plurality of stages according to the size of the powdered particles. Therefore, clogging caused by the powdered particles hardly occurs in each filtering device 91, and it is thus possible to use the filter 912 over a prolonged period of time without cleaning and exchanging the filter.

Further, although the filtering unit 90 is configured to include a plurality of filtering devices 91, for example, the filtering unit may include only one filtering device 91 when liquid hydrocarbons are not filtered continuously.

Further, in the above embodiment, natural gas is used as a hydrocarbon raw material to be supplied to the liquid fuel synthesizing system 1. However, for example, other hydrocarbon raw materials, such as asphalt and residual oil, may be used.

Moreover, although the liquid fuel synthesizing system 1 has been described in the above embodiment, the present invention can be applied to a hydrocarbon synthesis reaction system which synthesizes a hydrocarbon compound by a chemical reaction of a synthesis gas including at least hydrogen and carbon monoxide as main components, and a slurry. In addition, the hydrocarbon synthesis reaction system may be, for example, one including the FT synthesis unit 5 as a main component, and may be one mainly including the bubble column reactor 30, the separator 36, and the filtering unit 90 or the filtering device 91.

In addition, although the separator 36 is provided outside the bubble column reactor 30, for example, the separator may be included inside the bubble column reactor 30. That is, in the bubble column reactor 30, the liquid hydrocarbons included in the slurry may be separated from the slurry.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention relates to a synthesis reaction system which synthesizes a hydrocarbon compound by a chemical reaction of a synthesis gas including hydrogen and carbon monoxide as main components, and a slurry having solid catalyst particles suspended in liquid and which extracts the hydrocarbon compound from the slurry. Here, the synthesis reaction system includes a reactor to which the slurry is introduced and which synthesizes the hydrocarbon compound, a separator which separates the hydrocarbon compound included in the slurry inside the reactor from the slurry, and a filtering device which filters the hydrocarbon compound extracted from the separator, thereby trapping powdered particles powdered from the catalyst particles.

According to the present invention, it is possible to suppress mixing of the powdered particles into a hydrocarbon compound to be used in an upgrading section of liquid fuel products, and it is possible to prevent deterioration of the liquid fuel products.

The invention claimed is:

1. A synthesis reaction system for hydrocarbon compound, comprising:
   a reactor configured to synthesize a hydrocarbon compound by a chemical reaction of a synthesis gas including hydrogen and carbon monoxide as main components, and a slurry having solid catalyst particles suspended in liquid;
   a separator configured to separate the hydrocarbon compound from the slurry;
   a plurality of filtering devices configured to filter the hydrocarbon compound extracted from the separator to trap powdered catalyst particles, and arranged in parallel, wherein each filtering device comprises a filtering vessel and one or more filters disposed inside the filtering vessel;

a supply pipeline for supplying the hydrocarbon compound extracted from the separator to the plurality of filtering devices, the supply pipeline comprising a plurality of branch portions, each connecting the separator and one of the filtering devices, wherein each branch portion of the supply pipeline is provided with a valve which opens and closes the branch portion to individually switch supply of the hydrocarbon compound to each filtering device;

a discharge pipeline connected to the plurality of filtering devices for discharging the hydrocarbon compound filtered by the one or more filters from the filtering vessel of each filtering device to the outside of the filtering vessel of each filtering device, the discharge pipeline comprising a plurality of branch portions, each connected to one of the filtering devices;

a cleaning device comprising a cleaning fluid supply section and configured to remove from the one or more filters of the filtering vessel of each filtering device the powdered catalyst particles adhered to the one or more filters by supplying an inert gas from the cleaning fluid supply section to the filtering vessel through the one or more filters;

a gas supply pipeline connected to the discharge pipeline for supplying the inert gas from the cleaning device, the gas supply pipeline comprising a plurality of branch portions, each of which is connected to a branch portion of the discharge pipeline for supplying the inert gas into the filtering vessel of each filtering device through the one or more filters;

a gas discharge pipeline connected to an upper portion of the filtering vessel of each filtering device for discharging the inert gas supplied to the filtering vessel through the one or more filters from the filtering vessel, wherein the upper portion of the filtering vessel of each filtering device to which the gas discharge pipeline is connected is higher than one or more filters inside the filtering vessel; and a particle discharge pipeline connected to a lower end of the filtering vessel of each filtering device for discharging the powdered catalyst particles removed from the one or more filters from the filtering vessel, wherein the synthesis reaction system is configured such that while the hydrocarbon compound is filtered in one filtering device by opening the supply pipeline by the valve so that the one filtering device filters the hydrocarbon compound, the hydrocarbon compound is not filtered in at least one other filtering device by closing the supply pipeline by the valve and the one or more filters in at least one other filtering device are cleaned.

2. The synthesis reaction system for hydrocarbon compound according to claim 1, further comprising a differential pressure gauge configured to measure the differential pressure between the upstream and downstream of the plurality of filtering devices while the hydrocarbon compound has been filtered by the plurality of filtering devices.

3. The synthesis reaction system for hydrocarbon compound according to claim 1, wherein
the filter is a sintered metal mesh filter obtained by overlapping and sintering a plurality of metal meshes, and
the diameter of holes formed in the sintered metal mesh filter is a mean particle diameter or less of the powdered catalyst particles.

4. The synthesis reaction system for hydrocarbon compound according to claim 1,
wherein the filter is a sintered metal mesh filter obtained by overlapping and sintering a plurality of metal meshes, and
the diameter of holes formed in the sintered metal mesh filter is greater than 0 μm and equal to or less than 10 μm.

5. The synthesis reaction system for hydrocarbon compound according to claim 1, which is configured such that
the hydrocarbon compound is passed through the filter in a pre-determined direction to trap powdered catalyst particles, and
the cleaning fluid is passed through the filter in a direction opposite to the predetermined direction to remove the powdered catalyst particles from the filter.

6. The synthesis reaction system for hydrocarbon compound according to claim 5, wherein
a plurality of the filters are arranged in parallel to a direction in which the hydrocarbon compound is passed through, and wherein
when a filtering operation of the hydrocarbon compound is performed by one of the filters, the cleaning of the other of the filters is simultaneously performed.

7. The synthesis reaction system for hydrocarbon compound according to claim 5, further comprising
a differential pressure gauge for measuring the differential pressure between upstream and downstream of the plurality of filtering devices while the hydrocarbon compound has been filtered by the plurality of filtering devices, wherein
when a measurement result of the differential pressure by the differential pressure gauge is a pre-determined threshold value or more, the filter is switched to cleaning operation from filtering operation.

8. The synthesis reaction system for hydrocarbon compound according to claim 1, wherein
each branch portion of the gas supply pipeline is provided with a valve configured to selectively open and close the branch portion of the gas supply pipeline to individually switch the supply of the inert gas to each filtering device.

9. A powdered catalyst particles removing method performed after extracting a hydrocarbon compound from a slurry with the synthesis reaction system according to claim 1, the hydrocarbon compound being synthesized by a chemical reaction of a synthesis gas including hydrogen and carbon monoxide as main components, and the slurry having solid catalyst particles suspended in liquid, the removing method comprising:
a filtering step of making the hydrocarbon compound pass through the filters of the filtering vessel of each filtering device in a predetermined direction to trap powdered catalyst particles, and
a cleaning step of making a cleaning fluid pass through the filters in a direction opposite to the predetermined direction to remove the powdered catalyst particles from the filters, wherein
while the hydrocarbon compound is filtered in one filtering device by opening each supply pipeline by the valve so that the one filtering device filters the hydrocarbon compound, the hydrocarbon compound is not filtered in at least one other filtering device by closing the supply pipeline by the valve and the one or more filters in at least one other filtering device are cleaned.

10. The method of removing powdered catalyst particles according to claim 9, wherein
the differential pressure between the pressure of the hydrocarbon compound before flowing into the filter which carries out the filtering step and the pressure of the hydrocarbon compound which has been filtered and discharged from the filter is measured, and when a measurement result of the differential pressure becomes a predetermined threshold value or more, a step to be carried out in the filter is switched to the cleaning step from the filtering step.

11. The method of removing powdered catalyst particles according to claim 10, wherein the threshold value is greater than 0 kPa and equal to or less than 150 kPa.

* * * * *